United States Patent
Bruning et al.

(10) Patent No.: US 6,489,731 B1
(45) Date of Patent: Dec. 3, 2002

(54) POWER SUPPLY AND/OR BALLAST SYSTEM CONTROLLED BY DESIRED LOAD POWER SPECTRUM

(75) Inventors: Gert W. Bruning, Sleepy Hollow, NY (US); David A. Cammack, Scarborough, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/916,953

(22) Filed: Jul. 27, 2001

(51) Int. Cl.[7] .................................................. G05F 1/00
(52) U.S. Cl. ...................... 315/291; 315/307; 315/362; 315/194; 315/DIG. 7
(58) Field of Search .............................. 315/291, 307, 315/362, 209 R, 326, 194, 246, DIG. 7, 224; 363/34, 41, 98, 165

(56) References Cited

U.S. PATENT DOCUMENTS

| | | | |
|---|---|---|---|
| 5,371,440 A | * 12/1994 | Liu et al. ................. | 315/209 R |
| 5,623,187 A | * 4/1997 | Caldeira et al. ......... | 315/209 R |
| 5,872,429 A | * 2/1999 | Xia et al. .................... | 315/194 |
| 6,184,633 B1 | 2/2001 | Kramer ....................... | 315/246 |
| 6,400,100 B1 | * 6/2002 | Kramer ....................... | 315/194 |
| 6,407,515 B1 | * 6/2002 | Hesler et al. ............... | 315/224 |

* cited by examiner

Primary Examiner—Haissa Philogene

(57) ABSTRACT

A power supply and/or ballast optimizes performance of an electrical load, such as a High Intensity Discharge (HID) lamp by monitoring the current and voltage signal driving the load, and calculating a representative portion of the power spectrum being delivered to the load. The calculated portion of the delivered power spectrum is compared to a desired power spectrum, and the input signal to the load is modified in such a manner that the delivered power spectrum will more closely match the desired power spectrum. The input current and voltage, and the frequency at the load are thus not controlled directly, but are an indirect result of applying the modified input power spectrum to the load. By utilizing the input power spectrum in this manner, a power supply and/or ballast provides improved control and performance when used with electrical loads such as HID lamps.

35 Claims, 5 Drawing Sheets

POWER SUPPLY AND/OR BALLAST SYSTEM CONTROLLED BY DESIRED LOAD POWER SPECTRUM

TECHNICAL FIELD OF THE INVENTION

This invention relates to a power supply for an electrical load which requires a modulated input signal for proper operation, and more particularly to a ballast for a high-intensity gas discharge lamp.

BACKGROUND OF THE INVENTION

Certain types of electrical loads operate more efficiently or effectively when driven by an input current signal that is both alternating and modulated in some manner. One example of such an electrical load is a high-intensity gas discharge (HID) lamp, of the type used indoors or outdoors for general illumination of parking lots and buildings.

As disclosed in U.S. Pat. No. 6,184,633 B1, the operational stability and uniformity of light generated by such HID lamps can be improved by driving the lamps with a swept frequency input signal that is either amplitude modulated, or sequentially alternated with a periodic change in the range of the swept frequency. In particular, an input signal is disclosed that includes a current frequency sweep from 45 to 55 kHz within a sweep time of about 10 milliseconds, in combination with either: a constant amplitude modulation frequency of about 24.5 Hz and a modulation index of 0.24; a periodic sequential change in sweep frequency to about 12.3 kHZ. In the '633 B1 patent, the swept frequency and amplitude modulating signals are generated separately and combined in a summing junction to produce the signal actually fed to the HID lamp. The modulation frequency is predetermined and maintained as a constant.

U.S. patent application Ser. No. 09/620,357 now U.S. Pat. No. 6,400,100, commonly assigned to the original assignee of the present application, provides additional methods and apparatus for determining the optimum modulation frequency and/or sequential operating frequency, through sequential and periodic measurement of maximum operating current and/or voltage delivered to the HID lamp at various amplitude modulating frequencies within a predetermined range of frequencies. Once the appropriate values are determined, the '357 application utilizes the methods and apparatus disclosed in the '633 B1 patent for producing the input waveform.

Although the teachings of the above referenced patent and application provide considerably improved performance with electrical loads, such as HID lamps, additional improvement is desirable. The above referenced patent relies on predetermined operating parameters believed to provide optimal performance. The above referenced patent application improves on this by utilizing feedback measurements of lamp current and voltage to adjust operating parameters for optimal performance. Variations in performance between HID lamps, and installation specific considerations, such as horizontal vs. vertical installation positions of the lamp, may introduce variables that are not addressed by either the above referenced patent or application. It is also desirable that a power supply and/or ballast be adaptable for providing optimized performance with more than one type of load (HID lamp type or size).

What is needed, therefore, is an improved power supply and/or ballast.

SUMMARY OF THE INVENTION

Our invention provides such an improved power supply and/or ballast through recognition that it is really the power spectrum delivered to the electrical load that is important in optimizing performance. Our invention monitors the current and voltage signal driving the load, and calculates a representative portion of the power spectrum being delivered to the load. The calculated portion of the delivered power spectrum is compared to a desired power spectrum, and the input signal to the load is modified in such a manner that the delivered power spectrum will more closely match the desired power spectrum. The input current and voltage, and the frequency at the load are thus not controlled directly, as was the case in the prior art, but are an indirect result of applying the modified input power spectrum to the load. By utilizing the input power spectrum in this manner, our invention provides a power supply and/or ballast that achieves improved control and performance when used with electrical loads such as HID lamps.

One form of our invention provides a method for operating a power source adapted to supply an input signal having an alternating current and voltage to an electrical load in a manner providing a desired power spectrum to the electrical load. The method includes calculating a portion of the power spectrum being delivered to the electrical load by the input signal, and modifying the input signal in such a manner that the delivered power spectrum more closely matched the desired power spectrum. The step of calculating a portion of the delivered power spectrum may include monitoring and integrating the alternating current and voltage of the input signal. The method may further include storing a representation of the desired power spectrum in the power source.

In some embodiments of our invention, the power source includes a pulse width modulated signal generator. The step of modifying the input signal includes controlling the pulse width modulated signal generator to produce the desired power spectrum. In embodiments where it is desired that the input signal be an amplitude modulated swept frequency signal, having a number of parameters including an amplitude, a sweeping frequency ranging between a first lower frequency and a second higher frequency value in a specified period of time, an adjustable modulating frequency, and an adjustable modulation index, the step of modifying the input signal includes controlling the pulse width modulated signal generator to adjust one or more of these parameters. Our method may also include additional steps for independently selecting the value of one or more of the parameters, on the basis of a sweep of current or voltage delivered to the electrical load at various modulating or sweeping frequencies.

Our invention may also take the form of an apparatus or code on a computer readable medium for performing the method of our invention.

In one form of our invention, an apparatus is provided for operating a high intensity discharge lamp (HID lamp) in a manner producing a desired power spectrum for driving the lamp. The apparatus includes a pulse width modulator having a first input adapted for connection to a source of electrical power, a second input for receiving a control signal, and an output adapted for coupling to the HID lamp. The pulse width modulator is configured to provide an amplitude modulated swept frequency signal to the lamp, with the signal having an alternating current and voltage and generating a delivered power spectrum at the lamp, when the apparatus is connected between a source of electrical power and the lamp. The apparatus also includes a controller having an input operatively coupled to the output of the pulse width modulator, for receiving the alternating current and voltage signal, and an output operatively connected to the second input of the pulse width modulator for delivering a control signal to the pulse width modulator. The controller is configured for calculating a portion of the delivered power spectrum, and for providing a control signal to the pulse width modulator for modifying the input signal in such a manner that the delivered power spectrum more closely matches the desired power spectrum.

The controller of the apparatus may include a processor for monitoring and integrating the alternating current and voltage input signal to compute a portion of the delivered power spectrum. The controller may also include means for storing a representation of the desired power spectrum.

The apparatus may also be implemented in either an analog or a digital pulse width modulated form, using either symmetric or asymmetric PWM control.

The foregoing and other features and advantages of our invention will become further apparent from the following detailed description of exemplary embodiments, read in conjunction with the accompanying drawings. The detailed description and drawings are merely illustrative of our invention rather than limiting, the scope of the invention being defined by the appended claims and equivalents thereof.

BRIEF DESCRIPTION OF THE PRESENTLY PREFERRED EMBODIMENTS

Figure 1:
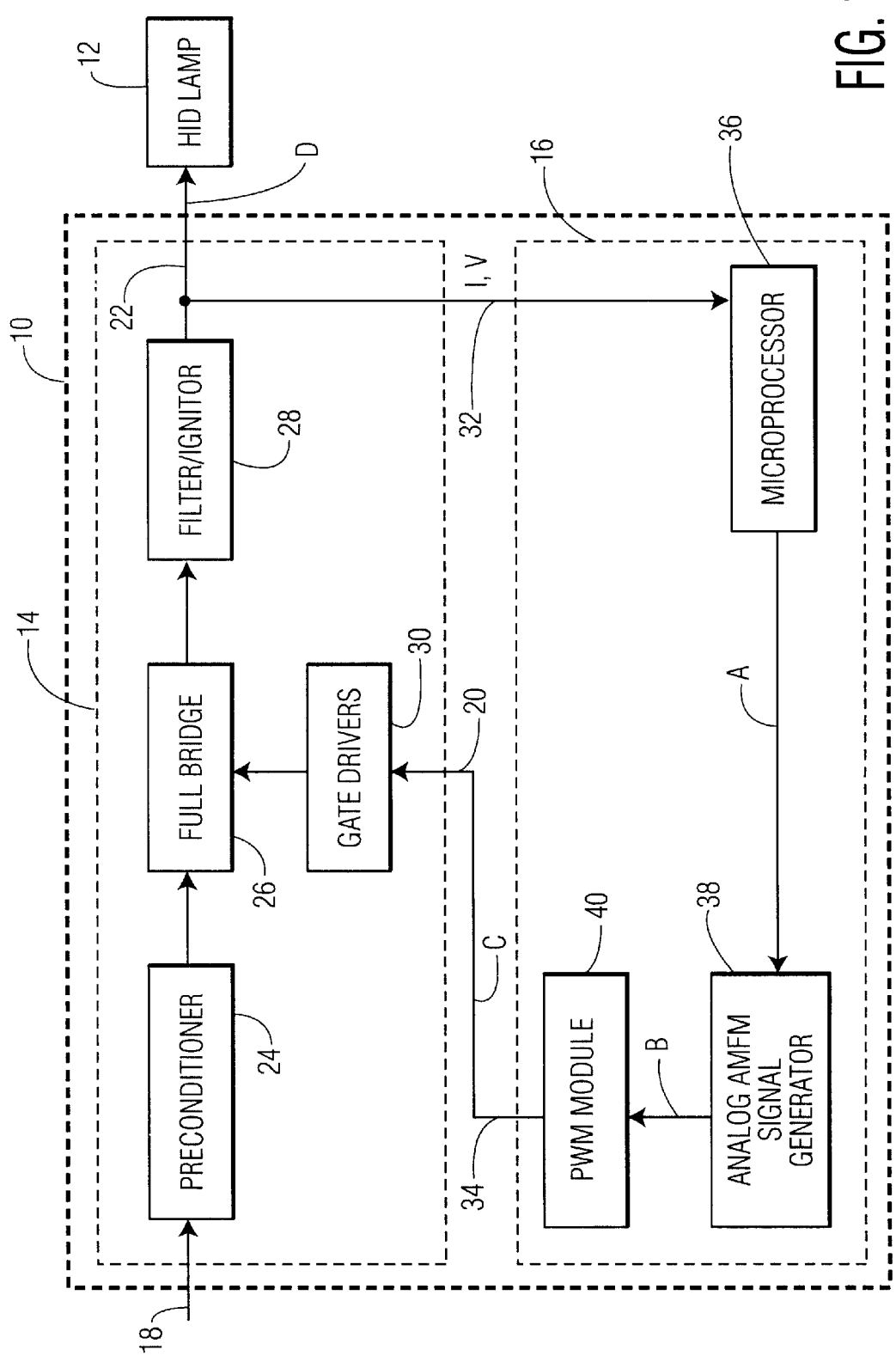
FIG. 1 is a block diagram of an exemplary apparatus according to our invention.

FIG. 1 shows an exemplary apparatus 10, according to our invention, adapted for providing an input signal having an alternating current and voltage to an electrical load 12 in a manner providing a desired power spectrum to the load 12.

Specifically, the apparatus depicted in FIG. 1 is in the form of a power source or ballast 10 for driving an electrical load in the form of a high intensity discharge (HID) lamp 12. The power source 10 includes a pulse width modulator 14 and a controller 16.

The pulse width modulator 14 has a first input 18 adapted for connection to a source of electrical power, such as a commercial alternating current power grid (not shown). The pulse width modulator 14 also includes a second input 20 for receiving a control signal 'C', and an output 22 for coupling the power source 10 to the HID lamp 12. The pulse width modulator 14 further includes a preconditioner 24, a full bridge inverter 26, and a filter/ignitor 28 connected sequentially in a series circuit relationship between the first input 18 and the output 22 of the pulse width modulator 14. The pulse width modulator 14 also includes gate drivers 30 connected in a series circuit relationship between the second input 20 and the full bridge 26.

The controller 16 has an input 32 operatively coupled to the output 22 of the pulse width modulator 14 for receiving the alternating current and voltage signal 'D', and an output 34 operatively connected to the second input 20 of the pulse width modulator 14 for delivering a control signal 'C' to the gate drivers 30. The controller 16 also includes a microprocessor 36, an analog AMFM signal generator 38, and a PWM module 40 sequentially connected in a series circuit relationship between the input 32 and the output 34 of the controller 16.

The pulse width modulator 14 of the exemplary embodiment is configured for providing an amplitude modulated swept frequency signal 'D' to the lamp 12, with the signal having an alternating current and voltage, and in conjunction with the lamp 12 generating a delivered power spectrum at the lamp 12, when the power source 10 is connected between the source of electrical power and the lamp 12.

The controller 16 is configured for calculating a portion of the delivered power spectrum, and for providing a control signal to the pulse width modulator 14 for modifying the input signal 'D' in such a manner that the delivered power spectrum is modified to more closely match the desired power spectrum.

Figure 2:
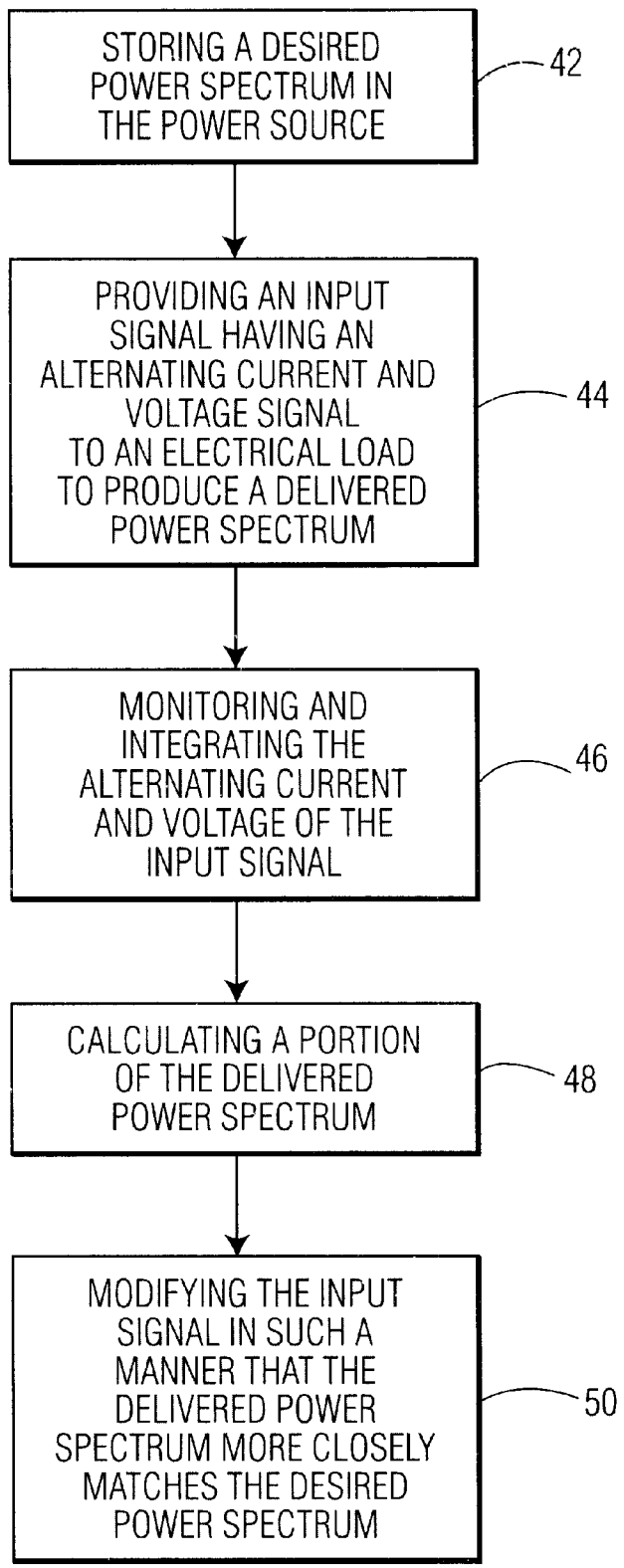
FIG. 2 is a flow diagram of a method according to our invention.

Specific operation of the power source 10 will be discussed in detail below. General operation, as depicted in FIG. 2, includes storing 42 a representation of a desired power spectrum in the microprocessor 36 of the controller 16 of the power source 10. The desired power spectrum is selected on the basis of operating characteristics and desired performance of the lamp 12. Other operating instructions required to initially start the power supply 10 and ignite the lamp 12 may also be stored in the microprocessor 36.

The microprocessor 36 sends a signal 'A' containing operating parameters of the desired power spectrum to the analog AMFM signal generator 38, which in turn generates an analog control signal 'B' that is supplied to the PWM module 40. The PWM module 40 combines the analog control signal 'B' with a PWM frequency signal, through the PWM process, and supplies a PWM control signal 'C' to the gate drivers 30.

The gate drivers 30 control the switching of the full bridge 26, according to the PWM control signal 'C', to generate the alternating current and voltage signal delivered to the lamp 12. Specifically, the full bridge 26 is switched to alternately conduct and block power received at the full bridge 26 from the input 18 of the power source. The preconditioner 24 and filter/igniter 28 are utilized in a manner well known in the art to shape the alternating current and voltage signal produced by the full bridge 26, by adjusting voltage and frequency of the input 18 delivered to the full bridge 26, and by selectively blocking unwanted harmonics generated by the switching process.

With the pulse width modulator 14 operating 44 to provide the lamp 12 with an input signal 'D' to the lamp 12, having an alternating current and voltage signal 'D' and generating a delivered power spectrum at the lamp 12, the microprocessor 36 monitors and integrates 46 the alternating current and voltage signal delivered to the lamp 12, and calculates 48 a portion of the delivered power spectrum, through a process such as Fast Fourier Transform (FFT). Although it is possible to calculate a complete power spectrum FFT, it is not necessary or desirable in a practical sense to consider all of the terms of the spectrum in developing a modified signal for driving the lamp 12 in a manner providing an acceptable match between the delivered and desired power spectra. Calculating only a portion of the delivered power spectrum provides a saving in required computational capacity and reduces the time required to complete the calculation.

After comparing the calculated portion of the delivered power spectrum to the desired power spectrum, the microprocessor 36 generates and sends a modified signal 'A' to the analog AMFM signal generator 38 for modifying the analog signal 'B' supplied to the PWM module 40. The PWM module 40 in turn generates and sends a modified PWM control signal 'C' to the gate drivers 30, causing the gate drivers 30 to modify the switching of the full bridge 26 in a manner that results in the pulse width modulator 14 delivering 50 a modified input signal 'D' to the lamp 12, which produces a delivered power spectrum at the lamp 12 that more closely matches the desired power spectrum stored in the microprocessor 36.

There are many ways in which the particular details of our invention can be embodied in an apparatus, method, or a computer readable code in accordance with our invention. It will be recognized by those having skill in the art that the controller 16 can be configured as an analog device using either symmetric or asymmetric PWM control. The controller may also be a digital device, such as a digital signal processor, or a combination of analog and digital devices.

EXAMPLES

Figure 5:
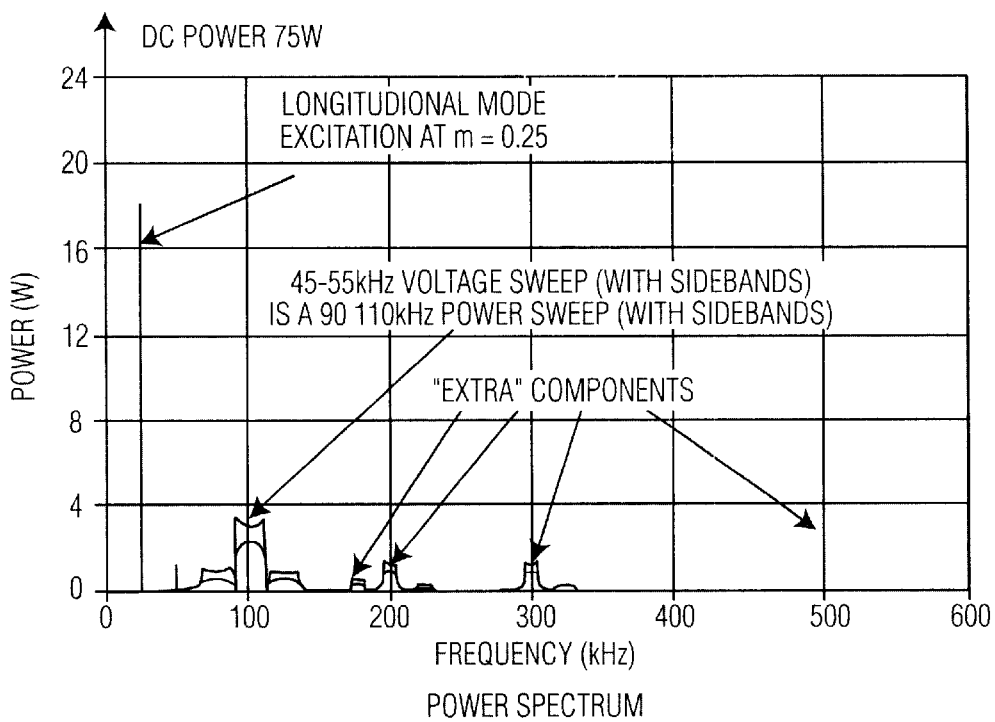
FIG. 5 is a graph illustrating a representative power spectrum for a power source driving an HID lamp, according to our invention.

The following examples illustrate operation of several forms of a power source 10 according to our invention driving a 70 watt HID lamp 12 with a desired power spectrum as depicted in FIG. 5. To achieve the desired power spectrum shown in FIG. 5, the lamp 12 is driven by an amplitude modulated swept frequency signal 'D' having a frequency sweep from 45 to 55 kHz in 10 ms, with an amplitude modulated at a modulation index of approximately 24% and a frequency of about 25 kHz. The theoretical combined input signal 'D' produced with these parameters is represented as $V(t)=A(1+m \cos(2\pi f_1 t))\cos(2\pi f(t)t)$, where A represents the amplitude of the signal, m represents the modulation index, f1 represents the amplitude modulation frequency, and f(t) represents the sweep frequency as a function of time. The modulation index is the percentage change in total amplitude resulting from amplitude modulating the swept frequency signal. The lamp resistance is essentially constant, except for a small change over the life of the bulb, and is thus assumed constant for the purpose of the following examples.

Example 1

Figure 3:
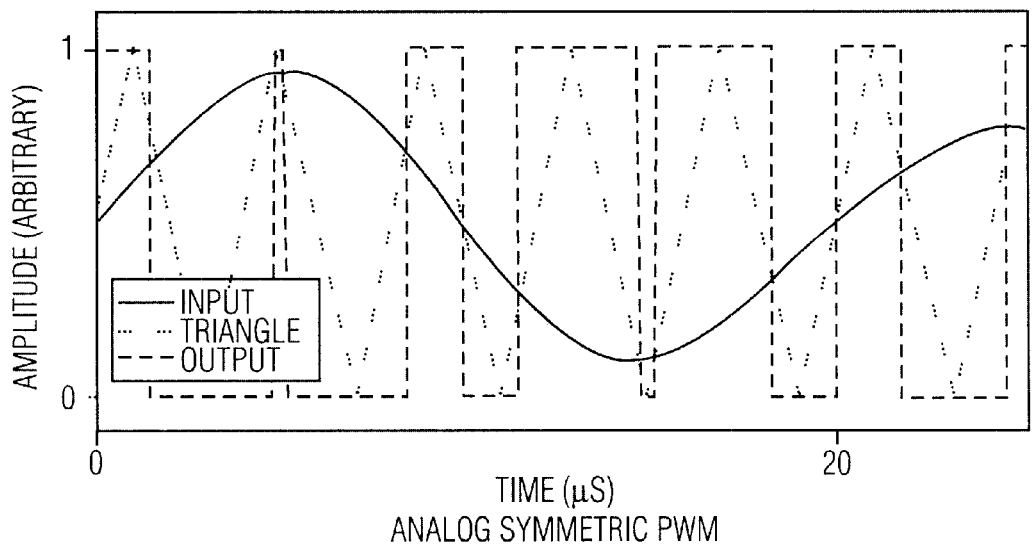
FIGS. 3 and 4 are graphs illustrating operation of an apparatus according to our invention utilizing analog symmetric PWM and asymmetrical PWM control respectively.

FIG. 3 depicts operation of the power source 10 as an analog symmetrical PWM control device to produce an exemplary desired power spectrum, as depicted in FIG. 5. The signal labeled as "triangle" is a signal generated within the PWM module 40. The signal labeled "input" is the desired amplitude modulated swept frequency waveform 'D' supplied to the lamp 12, with a DC level added which is approximately half the peak voltage of the triangle signal. This is the waveform provided by the signal generator 38, and labeled as signal 'B' in FIG. 1. During each cycle of the triangle, the PWM module output goes "high" when the triangle first equals the input, and goes "low" when the input drops below the triangle. The resulting signal is labeled "output," and is the signal labeled as 'C' in FIG. 1.

The minimum pulse width produced is determined by the maximum and minimum values of the input waveform relative to the maximum and minimum values of the triangle. The amplitude A of the input signal thus determines the range of pulse widths that may be used. Because the input signal has a DC level of half of the triangle peak voltage, the average pulse width will be 50% of the PWM period and the bridge output will not contain a DC term. The maximum theoretical value of the input waveform 'B' is, therefore, A(1+m). However, because a practical bridge cannot operate with 0–100% pulse width modulation, due to rise and fall times in a real circuit, our example assumes that a 10–90% modulation range is about as much as can be practically realized.

With a PWM rate (triangle frequency) of 250 kHz or higher, the analog symmetric PWM controller described above yields a lamp drive waveform 'D' that provides a delivered power spectrum which closely approximates, i.e. within 5%, the desired power spectrum depicted in FIG. 5. The presence or absence and exact frequencies of the "extra components" of the delivered power spectrum are a function of the actual PWM rate selected, and of the operating characteristics of the filter/igniter 28.

It is contemplated that filter/igniter 28 will be an LCC device designed to perform a number of functions. The filter provides positive incremental resistance to offset any the negative resistance of the lamp 12. It attenuates unwanted high frequency components of the bridge output while preserving the desired components. It allows for lamp run up, and accomplishes resonant ignition. With proper design according to established techniques, a filter/igniter 28 providing the correct power spectrum at the lamp 12 is achieved.

Figure 7:
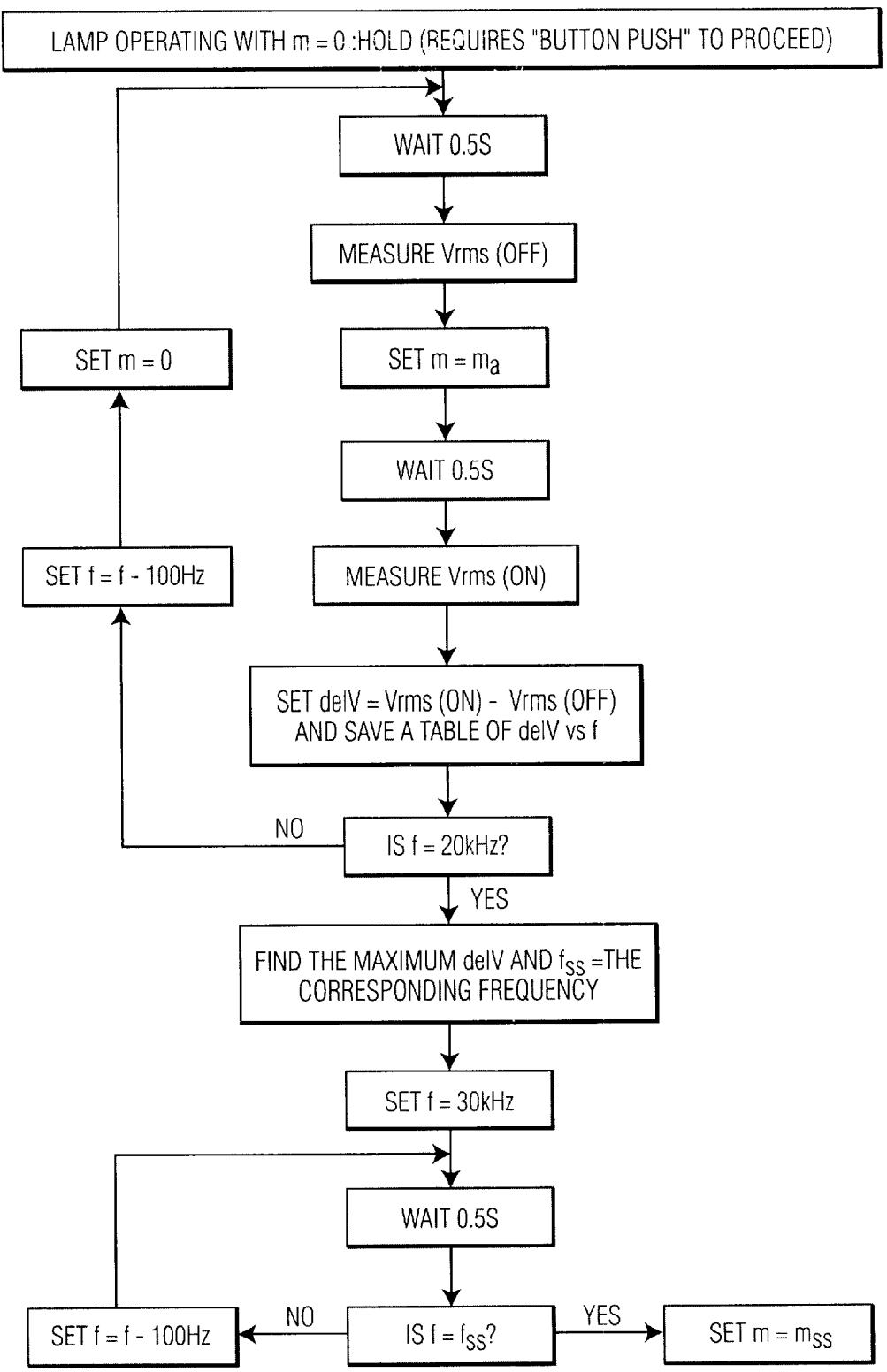
FIG. 7 is a flow diagram of a method for selecting parameters of an input signal to an HID lamp, in a manner according to our invention.

During operation of the power source 10, the microprocessor 36 will adjust values of the parameters A, m, $f_1$, and f(t) to continually update the delivered power spectrum in a manner yielding a delivered power spectrum which more closely matched the desired power spectrum. In some forms of our invention, it may be desirable to have the controller 16 perform additional procedures, as illustrated in FIG. 7, to allow for run up of the lamp 12, and to select an optimal amplitude modulation frequency $f_1$. In the process of FIG. 7, the controller 16 utilizes three predetermined values of m to allow for run up and selection of the amplitude modulating frequency $f_1$, in a manner described in more detail in co-pending U.S. patent application Ser. No. 09/620,357, which is incorporated herein by reference. During run up of the lamp 12, the value of the parameter m is set equal to zero (m=0), such that ignition and run up are accomplished with only a swept frequency signal. Following run up, the parameter m is set to a small non-zero value, for example m less than 0.09, and the lamp voltage is monitored as the amplitude modulation frequency ($f_1$) is incremented through the range of modulation frequencies, to select the modulation frequency ($f_{ss}$) at which lamp performance is optimized. Once this optimum frequency is determined, the value of m is set to a steady state operating value $m_{ss}$, which for Example 1 would be approximately m=0.24.

The capability for continually modifying the PWM output signal 'D' in a controller 16 according to our invention allows great flexibility in delivering a power spectrum that is optimized for a given load and operating condition. For example, the present value of m can be measured from the output spectrum, and compared to a desired value of m for a particular operating condition. The controller can then adjust the power spectrum to minimize the difference between the measured and desired values of m. The controller 16 can be programmed to adjust any or all of the applicable parameters periodically and/or run any additional process such as the one shown in FIG. 7, as required to deliver a power spectrum that closely matches a desired power spectrum

Example 2

Figure 4:
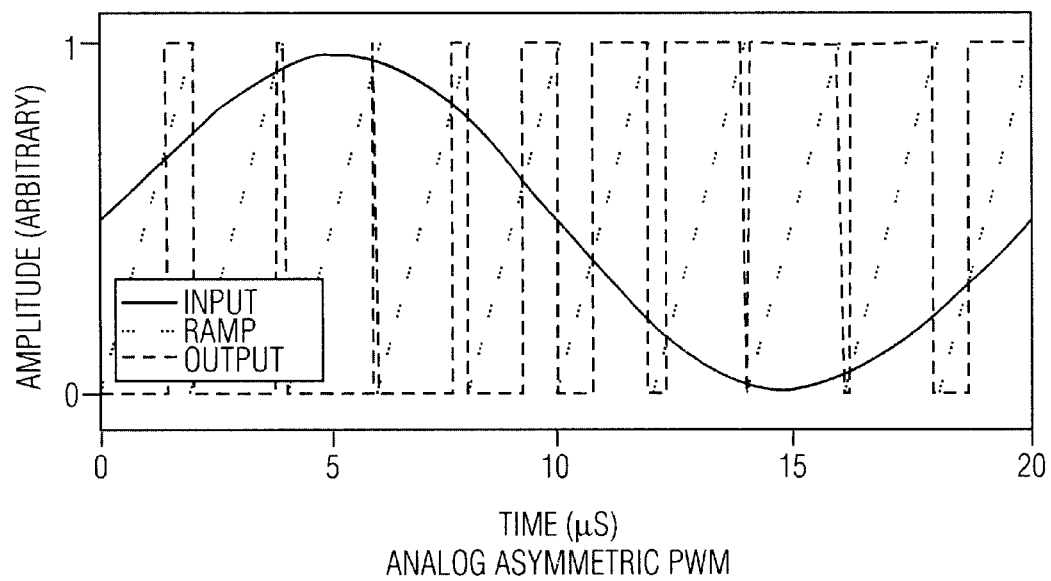

FIG. 4 depicts operation of the power source 10 as an analog asymmetric PWM control device to produce an exemplary desired power spectrum, as depicted in FIG. 5. The signal labeled as "ramp" is a signal generated within the PWM module 40. The signal labeled "input" is the desired amplitude modulated swept frequency waveform 'D' supplied to the lamp 12, with a DC level added which is approximately half the peak voltage of the triangle signal. This is the waveform provided by the signal generator 38, and labeled as signal 'B' in FIG. 1. During each cycle of the ramp, the PWM module output goes "high" when the ramp first equals the input, and goes "low" when the ramp resets at the end of its cycle. The resulting signal is labeled "output," and is the signal labeled as 'C' in FIG. 1.

In similar fashion to the analog symmetric controller of Example 1, the analog asymmetric controller of Example 2 is assumed to operate with a maximum practical modulation range of about 10–90%. For the asymmetrical analog controller, however, it is contemplated that the PWM rate (ramp frequency) may have to be somewhat higher (above 325 kHz, for example) to achieve a delivered power spectrum that closely matches the desired power spectrum of FIG. 5, when operating at the conditions described above for driving a 70 watt HID lamp. In other respects, the comments and description given above relating to Example 1 apply with similar efficacy to the analog asymmetric PWM controller of Example 2.

Example 3

Figure 6:
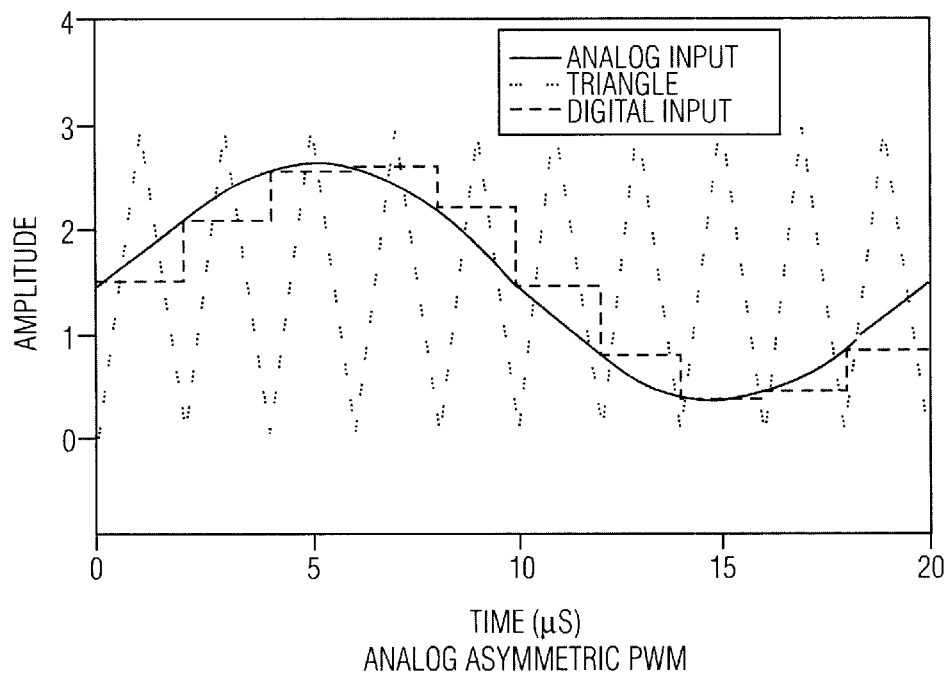
FIG. 6 is a graph comparing digital vs. analog PWM control, according to our invention.

We contemplate that in some forms of our invention, it may be preferable to perform the entire PWM process in a Digital Signal Processor (DSP), which essentially replaces the analog controller 16 depicted in FIG. 1. FIG. 6 depicts a comparison of operation of the power source 10 in the form of a digital symmetric PWM control device, to the operation of an analog symmetric PWM device, in producing the exemplary desired power spectrum, as depicted in FIG. 5.

The signals labeled as "triangle" and "analog input" in FIG. 6 do not exist, in reality, in a digital PWM controller, but instead represent the mathematical computation performed by the DSP. With such a DSP controller, we contemplate that it would be necessary to operate the DSP at a PWM rate of about 500 kHz or above to achieve a delivered power spectrum that closely matches the desired power spectrum of FIG. 5, when operating at the conditions described above for driving a 70 watt HID lamp. In other respects, the comments and description given above relating to Examples 1 and 2 apply with similar efficacy to the digital symmetric PWM controller of Example 3. We further contemplate that in other forms of our invention, a digital asymmetric PWM controller may provide the best design solution for a given load and operating condition.

Although the foregoing description has utilized certain exemplary embodiments of our invention, many other changes and modifications can be made without departing from the spirit and scope of the invention.

From the foregoing description, it has been shown that our invention provides the capability for delivering a power spectrum to an electrical load that matches a desired power spectrum more closely than was achievable by prior art methods and power sources.

The scope of our invention is limited only by the appended claims, and all changes that come within the meaning and range of equivalents are intended to be embraced therein.

We claim:

1. A method for operating a power source adapted for providing an input signal having an alternating current and voltage to an electrical load in a manner providing a desired power spectrum to the electrical load, the method comprising:

calculating a portion of the power spectrum being delivered to the electrical load by the input signal; and modifying the input signal in such a manner that the delivered power spectrum more closely matches the desired power spectrum.

2. The method of claim 1 wherein calculating the portion of the delivered power spectrum includes monitoring the alternating current and voltage input signal.

3. The method of claim 1 further including:

storing the desired power spectrum in the power source.

4. The method of claim 1 wherein the power source includes a pulse width modulated signal generator, and modifying the input signal includes controlling the pulse width modulated signal generator to produce the desired power spectrum.

5. The method of claim 4 wherein:

the input signal is an amplitude modulated swept frequency signal, having an amplitude, a sweeping frequency ranging between a first lower frequency and a second higher frequency value in a specified period of time, an adjustable modulating frequency, and an adjustable modulation index; and modifying the input signal includes controlling the pulse width modulated signal generator to adjust one or more of the amplitude, the sweeping frequency, the lower or upper frequency values, the period of time for the sweep, the modulation frequency, and the modulation index.

6. The method of claim 5 wherein the sweeping frequency ranges from a frequency of about 45 kHz to a frequency of about 55 kHz in a period of about 10 milliseconds, the modulating frequency is within the range of about 20 kHz to about 30 kHz, and the modulation index has a value within the range of about 0 to about 0.27.

7. The method of claim 5 wherein the modulating frequency is selected by monitoring the input voltage to the electrical load with respect to a reference voltage while incrementing the modulation frequency and selecting the modulating frequency providing the largest voltage differential between the reference and monitored value of input voltage.

8. The method of claim 5 wherein the modulation index is selected as a function of modulation frequency.

9. An apparatus adapted for providing an input signal having an alternating current and voltage to an electrical load in a manner providing a desired power spectrum to the electrical load, the apparatus comprising:

means for calculating a delivered power spectrum representing a portion of the power spectrum being delivered to the electrical load by the input signal; and means for modifying the input signal in such a manner that the delivered power spectrum more closely matches the desired power spectrum.

10. The apparatus of claim 9 wherein the means for calculating the delivered power spectrum includes means for monitoring and integrating the alternating current and voltage input signal.

11. The apparatus of claim 9 further including:
means for storing the desired power spectrum in the apparatus.

12. The apparatus of claim 9 further including:
a pulse width modulated signal generator, and the means for modifying the input signal includes means for controlling the pulse width modulated signal generator to produce the desired power spectrum.

13. The apparatus of claim 12 wherein:
the input signal is an amplitude modulated swept frequency signal, having an amplitude, a sweeping frequency ranging between a first lower frequency and a second higher frequency value in a specified period of time, an adjustable modulating frequency, and an adjustable modulation index; and
the means for modifying the input signal includes means for controlling the pulse width modulated signal generator to adjust one or more of the amplitude, the sweeping frequency, the lower or upper frequency values, the period of time for the sweep, the modulation frequency, and the modulation index.

14. The apparatus of claim 13 wherein the sweeping frequency ranges from a frequency of about 45 kHz to a frequency of about 55 kHz in a period of about 10 milliseconds, the modulating frequency is within the range of about 20 kHz to about 30 kHz, and the modulation index has a value within the range of about 0 to about 0.27.

15. The apparatus of claim 14 further including:
means for selecting the modulating frequency from a range of modulating frequencies.

16. The apparatus of claim 14 further including:
means for selecting the modulation index from a range of modulation indices.

17. An apparatus for operating a high intensity discharge lamp in a manner producing a desired power spectrum for driving the lamp, the apparatus comprising:
a pulse width modulator having a first input adapted for connection to a source of electrical power, a second input for receiving a control signal, and an output adapted for coupling to the high intensity discharge lamp, the pulse width modulator being configured for providing an amplitude modulated swept frequency signal to the lamp, the signal having an alternating current and voltage and generating a delivered power spectrum at the lamp when the apparatus is connected between the source of electrical power and the lamp; and
a controller having an input operatively coupled to the output of the pulse width modulator for receiving the alternating current and voltage signal, and an output operatively connected to the second input of the pulse width modulator for delivering a control signal thereto, the controller being configured for calculating a portion of the delivered power spectrum, and for providing a control signal to the pulse width modulator for modifying the input signal in such a manner that the delivered power spectrum more closely matches the desired power spectrum.

18. The apparatus of claim 17 wherein the controller includes a processor for monitoring and integrating the alternating current and voltage input signal.

19. The apparatus of claim 18 wherein the controller further includes:
means for storing the desired power spectrum.

20. The apparatus of claim 17 wherein:
the input signal is an amplitude modulated swept frequency signal, having an amplitude, a sweeping frequency ranging between a first lower frequency and a second higher frequency value in a specified period of time, an adjustable modulating frequency, and an adjustable modulation index; and
the controller includes means for controlling the pulse width modulated signal generator to adjust one or more of the amplitude, the sweeping frequency, the lower or upper frequency values, the period of time for the sweep, the modulation frequency, and the modulation index.

21. The apparatus of claim 20 wherein the sweeping frequency ranges from a frequency of about 45 kHz to a frequency of about 55 kHz in a period of about 10 milliseconds, the modulating frequency is within the range of about 20 kHz to about 30 kHz, and the modulation index has a value within the range of about 0 to about 0.27.

22. The apparatus of claim 20 further including:
means for selecting the modulating frequency from a range of modulating frequencies.

23. The apparatus of claim 20 further including:
means for selecting the modulation index from a range of modulation indices.

24. The apparatus of claim 17 wherein the controller is an analog controller.

25. The apparatus of claim 24 wherein the controller utilizes symmetric PWM control.

26. The apparatus of claim 17 wherein the controller is a digital controller having a digital signal processor.

27. The apparatus of claim 26 wherein the controller utilizes symmetric PWM control.

28. Code on a computer readable medium for operating a power source adapted for providing an input signal having an alternating current and voltage to an electrical load in a manner providing a desired power spectrum to the electrical load, the code comprising:
an instruction for calculating a portion of the power spectrum being delivered to the electrical load by the input signal; and
an instruction for modifying the input signal in such a manner that the delivered power spectrum more closely matches the desired power spectrum.

29. The code on computer readable medium of claim 28 wherein the instruction for calculating the portion of the delivered power spectrum includes an instruction for monitoring and integrating the alternating current and voltage input signal.

30. The code on computer readable medium of claim 28 further including:
an instruction for storing the desired power spectrum in the power source.

31. The code on computer readable medium of claim 28 further including:
an instruction for controlling a pulse width modulated signal generator, and wherein the instruction for modifying the input signal includes an instruction for controlling the pulse width modulated signal generator to produce the desired power spectrum.

32. The code on computer readable medium of claim 31 wherein:
the input signal is an amplitude modulated swept frequency signal, having an amplitude, a sweeping frequency ranging between a first lower frequency and a second higher frequency value in a specified period of time, an adjustable modulating frequency, and an adjustable modulation index; and
the instruction for modifying the input signal includes an instruction for controlling the pulse width modulated signal generator to adjust one or more of the amplitude, the sweeping frequency, the lower or upper frequency values, the period of time for the sweep, the modulation frequency, and the modulation index.

33. The code on computer readable medium of claim 32 further including:

instructions for providing an input signal having a sweeping frequency ranging from a frequency of about 45 kHz to a frequency of about 55 kHz in a period of about 10 milliseconds, with a modulating frequency in the range of about 20 kHz to about 30 kHz, and with a modulation index having a value within the range of about 0 to about 0.27.

34. The code on computer readable medium of claim 32 further including:

an instruction for selecting the modulating frequency by monitoring the input voltage to the lamp with respect to a reference voltage while incrementing the modulation frequency and selecting the modulating frequency providing the largest voltage differential between the reference and monitored value of input voltage.

35. The method of claim 32 further including:

an instruction for selecting the modulation index as a function of modulation frequency.

* * * * *